(12) United States Patent
Irie et al.

(10) Patent No.: US 8,204,312 B2
(45) Date of Patent: Jun. 19, 2012

(54) MOVING IMAGE EDITING APPARATUS

(75) Inventors: Atsushi Irie, Nara (JP); Erina Takikawa, Nara (JP); Yoshihisa Minato, Kyoto (JP); Naoki Maeda, Nara (JP); Nireko Matsubara, Kyoto (JP)

(73) Assignee: Omron Corporation, Kyoto (JP)

( * ) Notice: Subject to any disclaimer, the term of this patent is extended or adjusted under 35 U.S.C. 154(b) by 817 days.

(21) Appl. No.: 11/783,223

(22) Filed: Apr. 6, 2007

(65) Prior Publication Data

US 2007/0237360 A1    Oct. 11, 2007

(30) Foreign Application Priority Data

Apr. 6, 2006    (JP) ................................. 2006-105072

(51) Int. Cl.
*G06K 9/46*     (2006.01)
*G06F 3/00*     (2006.01)
(52) U.S. Cl. ...................................... 382/190; 715/721
(58) Field of Classification Search .................. 382/118, 382/190; 386/52; 715/721
See application file for complete search history.

(56) References Cited

U.S. PATENT DOCUMENTS

| | | | |
|---|---|---|---|
| 6,961,446 B2 | 11/2005 | Imagawa et al. | |
| 7,020,351 B1 * | 3/2006 | Kumar et al. | 382/305 |
| 7,146,028 B2 * | 12/2006 | Lestideau | 382/118 |
| 7,272,295 B1 * | 9/2007 | Christopher | 386/46 |
| 2001/0026633 A1 * | 10/2001 | Abdel-Mottaleb et al. | 382/118 |
| 2001/0031129 A1 * | 10/2001 | Tajima | 386/46 |
| 2002/0114464 A1 * | 8/2002 | Wang | 380/216 |
| 2002/0146168 A1 * | 10/2002 | Lee et al. | 382/165 |
| 2003/0123850 A1 * | 7/2003 | Jun et al. | 386/68 |
| 2003/0234803 A1 * | 12/2003 | Toyama et al. | 345/716 |
| 2004/0151381 A1 * | 8/2004 | Porter et al. | 382/218 |
| 2005/0033758 A1 * | 2/2005 | Baxter | 707/100 |
| 2006/0008152 A1 * | 1/2006 | Kumar et al. | 382/190 |
| 2006/0251382 A1 * | 11/2006 | Vronay et al. | 386/52 |

FOREIGN PATENT DOCUMENTS

| | | |
|---|---|---|
| CN | 1344084 A | 4/2002 |
| JP | 2001-285787 A | 10/2001 |
| JP | 2002-344925 A | 11/2002 |

OTHER PUBLICATIONS

Jaffre et al. "Costume: A new feature for automatic video content indexing". Proceedings of RIAO—Coupling approaches, coupling media and coupling languages for information retrieval, Avignon, France 2004, 314-325.*
Acosta et al. "An automatic face detection and recognition system for video indexing applications". ICASSP—International Conference on Acoustics, Speech and Signal Processing. Orlando, FL, May 2002.*
Eickeler et al. "Content-based indexing of images and video using face detection and recognition methods". IACASSP, Salt Lake City, Utah, 2001.*
Lienhart et al. "Video Abstracting", Communications of ACM, Dec. 1997.*

\* cited by examiner

*Primary Examiner* — Li Liu
(74) *Attorney, Agent, or Firm* — Dickstein Shapiro LLP

(57) ABSTRACT

Apparatus and method for extracting from a moving image a scene in which an intended person appears by simple operations are provided. A moving image editing apparatus identifies a person as an extraction target based on an instruction of a user, tracks a face of the extraction target to thereby select a scene in which the extraction target appears in a moving image, and extracts a partial moving image containing the selected scene from the moving image.

6 Claims, 5 Drawing Sheets

Specification by user

Selection of extraction target

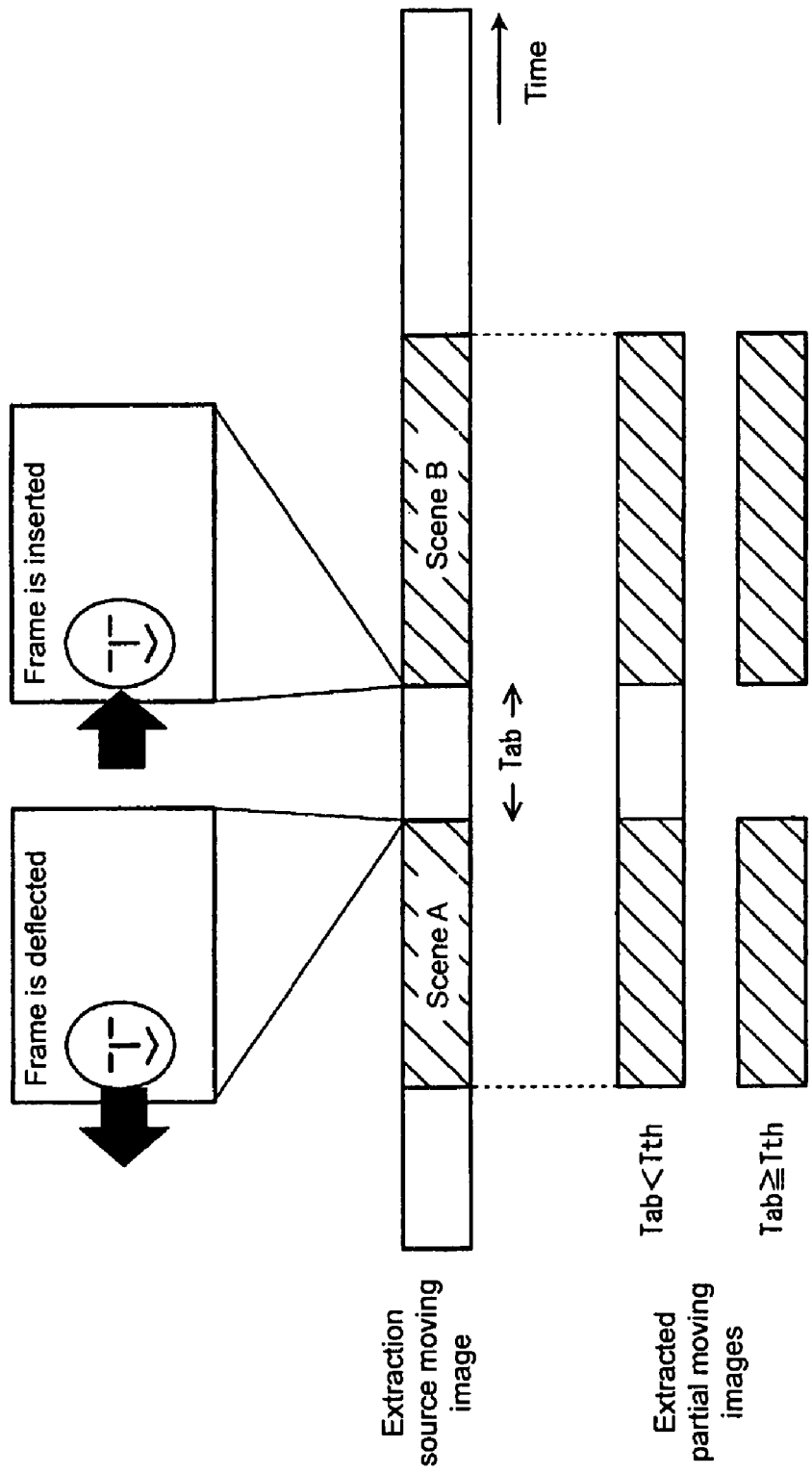

“MOVING IMAGE EDITING APPARATUS

BACKGROUND OF THE RELATED ART

1. Field of the Invention

The present invention relates to technology for extracting a desired scene from a moving image.

2. Description of the Related Art

With the appearance of a mass-capacity recording medium such as HDD and DVD, it is possible to shoot various scenes and save data of their moving images easily. However, it is not easy to search data of a large number of moving images or of prolonged moving images for a desired scene or to edit and compile such data. For example, to extract a scene in which a specific person appears, a user has to find the scene by using a slider etc. and specify a first frame and a last frame of the scene to be cut out. Such a task is difficult and time-consuming to do for a nonprofessional person. Therefore, there is a demand for technology to facilitate retrieval and editing of a moving image.

Japanese Laid-Open Patent Application No. 2005-99953 discloses a method of tracking a face in which a trial is made to detect a face at a predetermined frame interval until the face is detected, whereupon the face is tracked backward and forward along the time axis. Japanese Laid-Open Patent Application No. 2000-299829 discloses a method in which an apparatus correlates information of characteristics of a scene including a zone of the scene, a key frame, a degree of importance, and feature values of an image of the key frame to data of a moving image.

SUMMARY

A moving image editing apparatus includes a display unit capable of displaying a moving image, an extraction target determination unit for identifying a person to be extracted as an extraction target based on an instruction of a user, a scene locating unit for tracking a face of the extraction target to thereby select a scene in which the person appears in the moving image, and a partial moving image extraction unit for extracting from the moving image a partial moving image which includes the scene selected by the scene locating unit.

According to a moving image editing method, a moving image editing apparatus equipped with a display unit capable of displaying a moving image identifies a person as an extraction target based on an instruction of a user, tracks a face of the extraction target to thereby select a scene in which the person appears in a moving image, and extracts a partial moving image containing the selected scene from the moving image.

A moving image editing program causes a moving image editing apparatus equipped with a display unit capable of displaying a moving image to perform the steps of identifying a person as an extraction target based on an instruction of a user, tracking a face of the extraction target to thereby select a scene in which the person appears in a moving image; and extracting a partial moving image containing the selected scene from the extraction source moving image.

BRIEF DESCRIPTION OF THE DRAWINGS

FIG. 5 shows an operation example.

DETAILED DESCRIPTION

Figure 1:
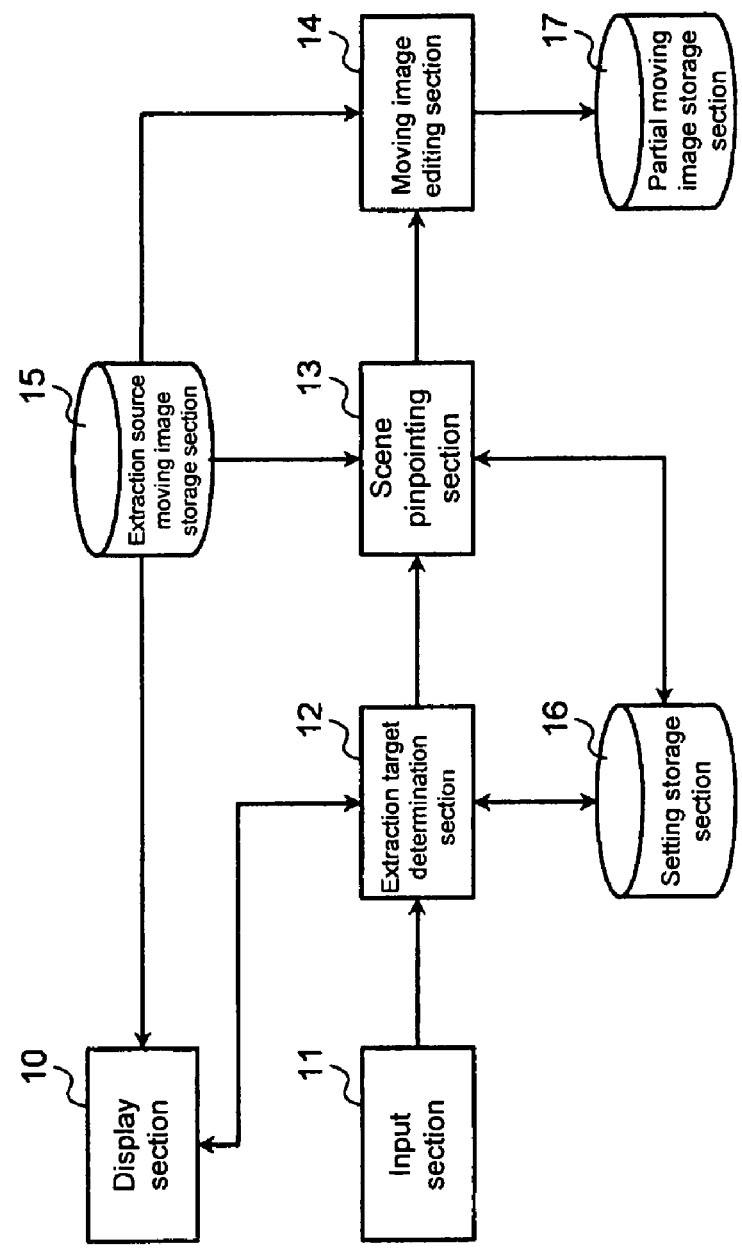
FIG. 1 shows a block diagram of a moving image editing apparatus according to an embodiment of the present invention.

FIG. 1 is a block diagram of a moving image editing apparatus according to an embodiment of the present invention.

As shown in FIG. 1, the moving image editing apparatus according to an embodiment of the invention includes a display section 10, an input section 11, an extraction target determination section 12, a scene locating section 13, a moving image editing section 14, an extraction source moving image storage section 15, a setting storage section 16, and a partial moving image storage section 17. In various embodiments, the moving image editing apparatus may include a general purpose computer equipped with a central processing unit (CPU), a main storage unit (memory), an auxiliary storage unit (hard disk, etc.), a display, and an input unit (mouse, keyboard, etc.) and software (program) that operates in the computer. The functional elements shown in FIG. 1 may be realized by the central processing unit executing the software and controlling, as required, hardware resources such as the main storage unit, the auxiliary storage unit, the display, and the input unit. In other embodiments, the functional elements may be constituted into a dedicated IC chip.

The moving image editing apparatus can be used for performing editing operations on a moving image. A moving image to be edited (extraction source moving image) needs only to be data that can be copied, for example, data photographed by a video camera or a video-recorded broadcast program.

An moving image to be used as the extraction source is stored in the extraction source moving image storage section 15. A partial moving image extracted from the moving image is stored in the partial moving image storage section 17. The extraction source moving image storage section 15 and the partial moving image storage section 17 may each be an involatile memory. For example, a hard disk (HDD) or a DVD may be employed. The setting storage section 16 stores data of various kinds of settings which are utilized in the process of editing moving images. The setting storage section 16 may also be constituted of an involatile memory. The storage sections 15, 16, and 17 may be constituted into a single hardware piece or constituted of separate hardware pieces, respectively.

The display section 10 is responsible for reading a moving image from the storage section, reproducing it, generating a user interface, and outputting data to the display. The input section 11 is a feature with which the user inputs an instruction to the moving image editing apparatus. The input section 11 may include, for example, a keyboard and a pointing device (mouse, touchpad, touch panel, a line-of-sight input device, etc.).

Functions and processing of the extraction target determination section 12, the scene locating section 13, and the moving image editing section 14 are described with the following operation examples.

Figure 2:
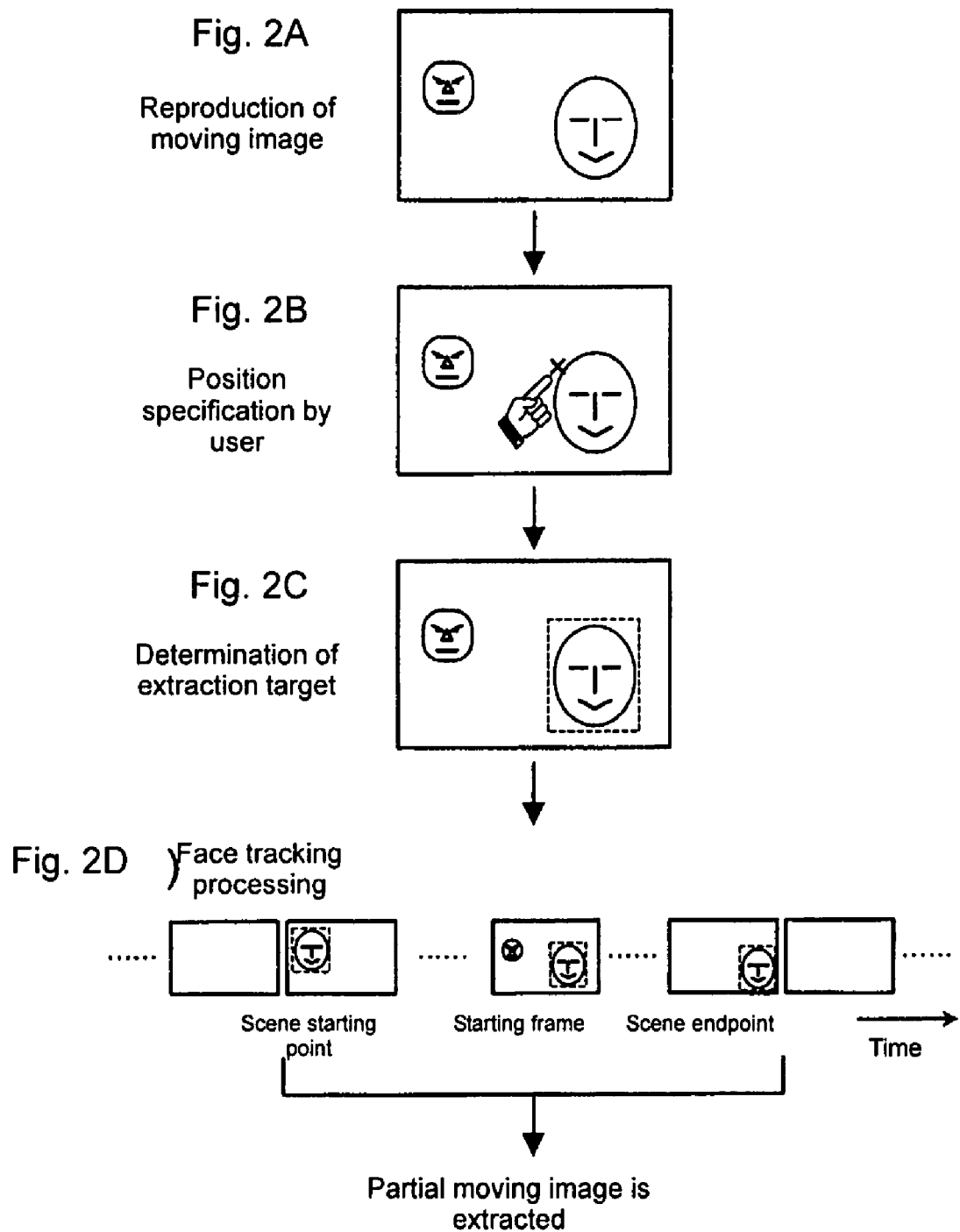
FIG. 2 shows an operation example.

When the user specifies moving images as an extraction source by using the input section 11, the display section 10 sequentially reads the moving images from the extraction source moving image storage section 15, performs processing required for moving-image reproduction, and displays them on the display (see FIG. 2A). Then, the extraction target determination section 12 waits for entry by the user.

When the user specifies one point (or region) in the displayed image by using the input section 11, the following automatic extraction processing starts. It is to be noted that after the automatic extraction processing starts, reproduction of the moving image may be stopped.

First, the extraction target determination section 12 identifies a person to be extracted, based on the point or region specified by the user (hereinafter referred to as "specified position"). The extraction target determination section 12 determines an extraction target by employing face detection processing. For example, the extraction target determination section 12 performs face detection in a predetermined face detection range around the specified position and, if a face is found at the specified position, selects the corresponding person as an extraction target. If no face is present at the specified position, it selects as an extraction target a person having a face detected at a place nearest to the specified position (see FIG. 2C). If no face is detected in the face detection range, it returns an error or performs face detection again over a widened range. It is to be noted that the face detection range may cover an entirety of the image.

Any existing technology may be applied for the face detection. Examples of such technologies are: (1) a technique to detect a face by performing template matching based on characteristics of the face (eyes, nose, ears, contour, etc.), (2) a technique for detecting the face by detecting the top of the head using chroma key processing, (3) a technique to detect a region whose color is close to that of a skin to thereby detecting the region as a face, and (4) a technique to detect a face by using a neural network.

If the extraction target determination section 12 determines an extraction target, the scene locating section 13 tracks the face of the person (face tracking processing). In the present embodiment, the face tracking processing is performed both the forward and backward directions along the time axis by using the image used for face detection as a starting frame. It is possible through the tracking processing to identify the same face in the images picked up at different times.

In identifying the same face through the face tracking processing, any of the existing technologies can be applied. The technologies include, for example, (1) a technique to utilize inter-frame correlations to thereby identify the same face in a current frame with reference to a position of the face in a previous frame, (2) a technique to obtain movement vectors of faces based on results of processing a plurality of frames to identify the same face in the current frame from the movement vectors, and (3) a technique to utilize a face recognition technology to thereby identify the same face based on a similarity of quantities of characteristics extracted from face images. These techniques may be combined in the face tracking processing. As such, more than one of the techniques may be used to derive one comprehensive solution (parallel combination) or switched (serial combination). For example, a parallel combination of techniques would be a means for selecting the most reliable solutions (results of identifications) provided by a plurality of techniques. A serial combination of techniques could involve for example, trying to track a face using one technique and if it fails, reattempt tracking using another technique. It may also involve switching between a technique that is highly accurate but has a large processing load and a technique that is not as highly accurate but has a small processing load. It is to be noted that it may be unnecessary to perform the face tracking processing on all frames. For example, if the extraction target is performing only small movements, face tracking processing may be performed every several frames.

The scene locating section 13 sets the "scene starting point" at the moment when sight of the extraction target is lost in the face tracking processing in the backward direction of the time axis and sets the "scene endpoint" at the moment when the sight of the extraction target is lost in the face tracking processing in the forward direction of the time axis (see FIG. 2D). In this way, the scene locating section 13 selects a scene in which an extraction target appears.

The moving image editing section 14 extracts the scene selected by the scene locating section 13 (i.e., the scene between the scene starting point and the scene endpoint) from the extraction source moving image. This extracted partial moving image is stored in the partial moving image storage section 17. It is to be noted that when creating a partial moving image, a margin of a predetermined number of frames may be added before the scene starting point and after the scene endpoint respectively.

According to the above-described processing, an instruction from the user specifying one point (or one region) on the screen triggers the apparatus to automatically determine an extraction target person, determine a starting point and an endpoint of a scene in which the person appears (scene search), and extract a partial moving image containing the scene. It is thus possible to extract a scene including a desired person by an extremely simple and intuitive operation.

After losing a sight of an extraction target, the scene locating section 13 may continue face detection processing up to a first or last frame of a moving image to select all scenes in which the extraction target appears from the entire moving image. If the scene locating section 13 selects a plurality of scenes, the moving image editing section 14 may create a partial moving image for each of the scenes or put the plurality of scenes into one partial moving image (an example of this processing will be described along with the an operation example below).

In contrast to the an operation example where an extraction target is determined on the basis of a position specified by the user, another operation example allows automatic selection of an extraction target from a frame specified by the user. The other respects of the operation examples may be the same.

During reproduction of a moving image, the user can specify a frame thereof by using the input section 11. The user can specify a frame by, for example, pressing a predetermined button on a displayed image or a user interface or pressing a mouse button or a key.

The extraction target determination section 12 detects a face from an image of the frame specified by the user. If only one person's face is detected, the extraction target determination section 12 identifies that person as an extraction target. If a plurality of faces are detected, the extraction target determination section 12 narrows down possible extraction targets based on predetermined feature values.

Examples of the feature values used to narrow down the possible extraction targets include a position, a size, and a direction of the face, the quantity of blurring of an image of the face, the openness of the eyes, and the direction of the line-of-sight. These quantities of characteristics reflect a "degree of being photogenic". The degree of being photogenic may be said to improve as, for example, the following conditions are established: the face is more at the center of the image; the size of the face is almost the same as a predetermined size; the face faces the front; the amount of blurring is small; the eyes are clearly open; and the line of sight is directed towards the front. In the user specified frame, it is more likely that the person whom the user wishes to extract has a high degree of being photogenic. Therefore, by determining an extraction target based on feature values that reflect the "degree of being photogenic", the extraction target determination section 12 can accurately narrow down potential results to a person intended by the user. The extraction target determination section 12 can either evaluate the degree of being photogenic based on any one of the quantities of characteristics or comprehensively evaluate the degree of being photogenic based on a combination of the quantities of characteristics. By combining the quantities of characteristics, a narrowing-down accuracy can be improved.

Also by the above-described processing, actions and effects similar to those of the operation examples described above can be obtained.

In yet another operation example, based on correlation information, a plurality of persons determined to be related to each other by the extraction target determination section 12 are selected as an extraction target. The correlation information is set in the setting storage section 16 beforehand. The other respects are the same as those of the first or second operation example.

The correlation information links at least two persons to each other and contains at least face definition information to define at least faces of the plurality of persons. The face definition information is utilized in face matching (face recognition) and is constituted of feature values extracted from, for example, a face image. The correlation information may be set in accordance with the following procedure. Step 1: The user selects a face image of each of the persons to be linked to each other. Step 2: Create face definition information from the face images of the persons selected. Step 3: Store a suite of the images into the setting storage section 16. In this embodiment, it is assumed that the correlation information is set prior to automatic extraction processing.

Figure 3:
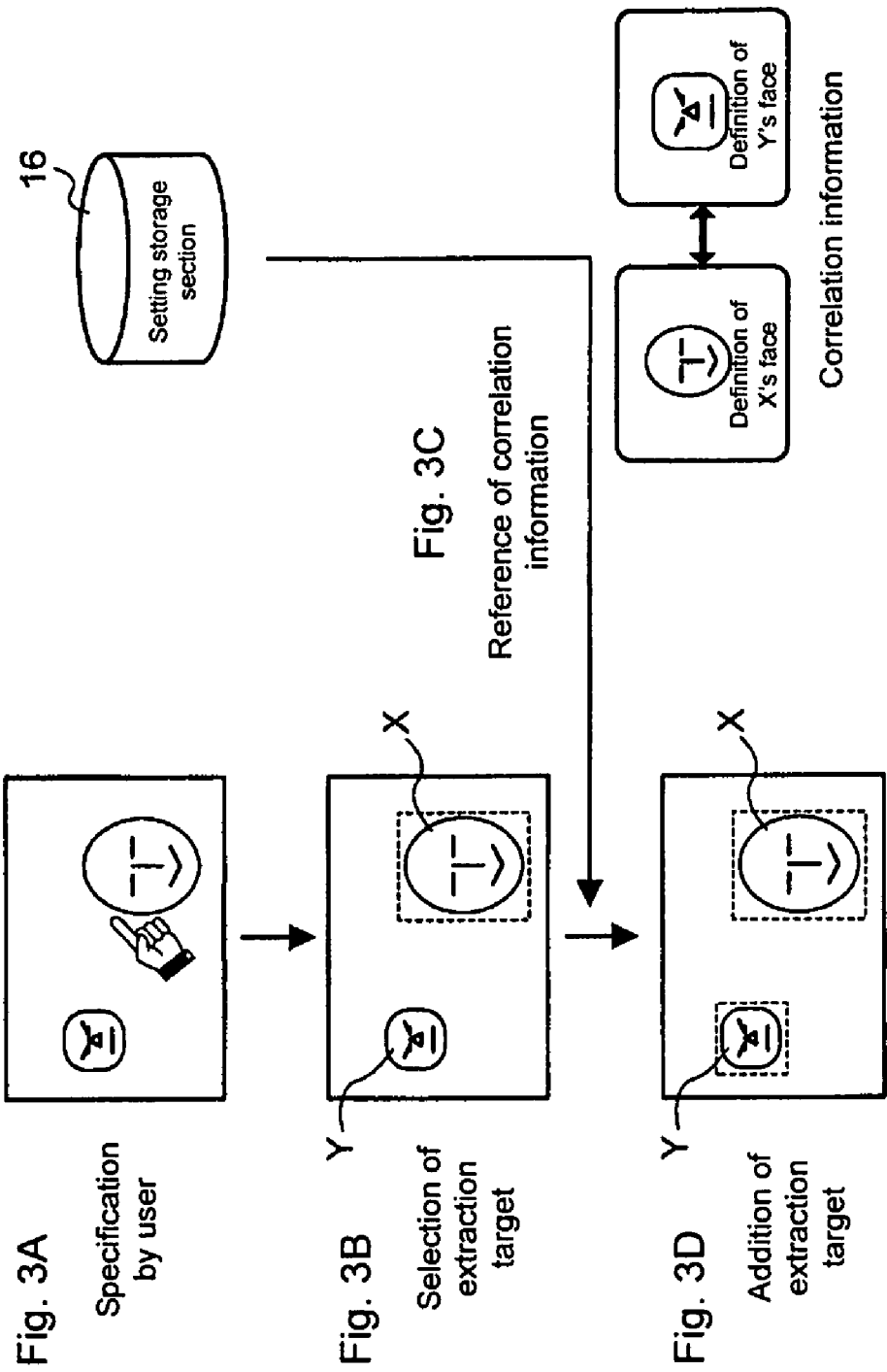
FIG. 3 shows an operation example.

FIG. 3 shows yet another operation example. When the user inputs an instruction by using the input section 11 (FIG. 3A), the extraction target determination section 12 selects an extraction target from an image being displayed, based on the instruction (FIG. 3B). This processing may be the same as that of the operation examples described above. In an example shown in FIG. 3B, X is selected as an extraction target.

Subsequently, the extraction target determination section 12 extracts feature values from a face image of the extraction target X and compares it to individual pieces of the face definition information to thereby confirm the correlation information containing the same face (see FIG. 3C). After having found the correlation information containing the same face, the extraction target determination section 12 adds to the extraction target any other person correlated with it by this correlation information. In an example of FIG. 3D, Y correlated with X is added to the extraction target.

The scene locating section 13 performs face tracking processing in a manner similar to the operation examples described above to select a scene in which X and Y appear, from a moving image. In this case, the user can set whether to select only a scene in which both X and Y appear or a scene in which at least one of X and Y appears. The subsequent processing is the same as that of the operation examples described above.

Therefore, by specifying one of a plurality of related persons on the display screen, the plurality of persons are all automatically identified as an extraction target. Therefore, the user can easily cut out a moving image of a group such as friends or family members.

A method of allowing the user to identify an extraction target in a list of face images will be described in the operation example below.

The face image list is stored in the setting storage section 16 beforehand. Face images may be registered in the face image list automatically by the apparatus or manually by the user. According to one example of a method of automatic registration by the apparatus, face detection is performed for each predetermined number of frames to detect a new face and the face is registered in the face image list. As reproduction of a moving image goes on, persons who appears in the image are listed, so that it is possible to specify afterwards the persons who appeared in preceding scenes. According to a method of manual registration by the user, the user specifies a face in a displayed image so that the extraction target determination section 12 may register the face.

Figure 4:
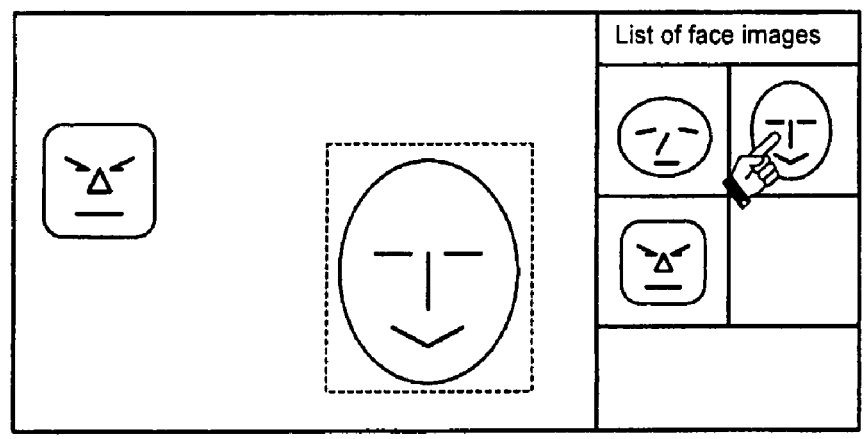
FIG. 4 shows an example of a face image list.

FIG. 4 shows an example of the displayed face image list. If the user specifies a person from the face image list while a moving image is being reproduced, the extraction target determination section 12 identifies the person as an extraction target. In this case, as in the third operation example, the extraction target determination section 12 may identify as an additional extraction target a person correlated to the person specified in the face image list. The subsequent processing is the same as that of the above-described operation examples. It is to be noted that if no extraction target face is detected in a frame being reproduced, face detection is performed in the backward and forward directions of the time axis to detect an extraction target, if any, in another frame, whereupon the scene locating section 13 may start face tracking processing from the frame.

Processing in yet another operation example is performed if at least two scenes in which an extraction target appears are selected by the scene locating section 13.

The moving image editing section 14 creates a partial moving image into which at least two scenes are put together. Specifically, as shown in FIG. 5, if a time interval Tab between two scenes A and B which are next to each other time-wise (time or the number of frames between an endpoint of the previous scene and a starting point of the following scene) is smaller than a threshold time Tth, the two scenes A and B are included in the same partial moving image. The threshold time Tth may be set in the setting storage section 16 beforehand.

In this case, the moving image editing section 14 may or may not include a portion between the two scenes A and B (i.e., portion where the extraction target does not appear) into the partial moving image. Whether to or not to include the portion may be changed in setting. Further, whether to include or not include the portion between the two scenes A and B into the partial moving image may also be switched to each other.

With the configuration, for example, if an extraction target gets out of a frame for a short period of time, if any other scene (including a TV commercial) is inserted into a scene in which the extraction target appears, or if a sight of a face is lost temporarily during face tracking, it is possible to prevent the partial moving image from being shredded, thereby improving convenience. Further, the configuration can be applied also to cut-out-and-edit operations for TV commercials.

In another embodiment, the extraction target determination section 12 may select a plurality of persons as an extraction target. The number of the extraction target persons may be specified each time by the user or set in the setting storage section 16 beforehand. For example, in a case where the user selects a plurality of extraction targets in the first or second operation example, the extraction target determination section 12 may select a plurality of persons in order of closeness to a position specified by the user or in order of being photogenic. In a case where there are a plurality of extraction targets, the extraction target determination section 12 may select a scene or create a partial moving image for each of the extraction targets or select the scene or create the partial moving image on the condition that at least one of the plurality of extraction targets is contained in it.

The extraction target determination section 12 may narrow down possible extraction targets with reference to preset attribute conditions (sex, age (age group), ethnic group, etc.). For example, in a case where a plurality of extraction target candidates are detected, the extraction target determination section 12 identifies the attributes from face images of the candidates, to preferentially select those who meet the above-described attribute conditions as an extraction target. In identifying the attributes, publicly known technologies can be employed. By this method, an intention of the user can be reflected accurately.

An extraction source moving image is not limited to one moving image. For example, the extraction target determination section may designate one or a plurality of moving images stored in the extraction source moving image storage section 15 as an extraction source moving image, and may therefore select a scene and extract a partial moving image from any or all of the moving images. This operation is suited for batch processing of a large number of moving images.

In the one operation example, the scene locating section 13 may determine whether an image of scene A and an image of scene B are correlated (continuity) using a criterion to decide whether the two scenes A and B should be combined. For example, the scene locating section 13 may compare a position or size of an extraction target or a movement vector between images of the last one or a plurality of frames of scene A and those of scene B. If the values agree or nearly agree, the scene locating section 12 may decide that the images of scenes A and B are correlated to each other and may put scenes A and B into one partial moving image. In another embodiment, it may put scenes A and B into one partial moving image only if the time interval between scenes A and B is smaller than the threshold Tth and if the images of scenes A and B are correlated to each other.

While the invention has been described above with respect to a series of examples, those skilled in the art, having benefit of this disclosure, will appreciate that other embodiments can be devised which do not depart from the scope of the invention as disclosed herein. Further, it should be appreciated that the various embodiments described above may be combined. Accordingly, the scope of the invention should be limited only by the attached claims.

What is claimed is:

1. A moving image editing apparatus comprising:
    a display unit capable of displaying a moving image;
    a face detection unit for detecting a face of a person from an image of a frame in the moving image,
    an extraction target determination unit configured to allow a user to specify the frame in the moving image displayed on the display unit, to automatically identify one of a plurality of persons in the specified frame as an extraction target based on an instruction of the user, and to automatically identify a related person to add to the extraction target based on predetermined correlation information linking the related person to the identified one of the plurality of persons;
    a scene locating unit for locating a scene in which the extraction target comprising the one of the plurality of persons and the related person appears in a moving image and for tracking the extraction target to determine a starting point and an ending point of the scene; and
    a partial moving image extraction unit for extracting a partial moving image comprising the scene from the moving image.

2. The moving image editing apparatus according to claim 1, wherein if a time interval between two scenes selected by the scene locating unit is smaller than a predetermined time interval, the partial moving image extraction unit extracts a partial moving image comprising both of the two scenes.

3. The moving image editing apparatus according to claim 1, wherein if images of two scenes selected by the scene locating unit are correlated to each other, the partial moving image extraction unit extracts a partial moving image comprising both of the two scenes.

4. The moving image editing apparatus according to claim 1, wherein if the face detection unit detects faces of a plurality of persons from the image of the specified frame, the extraction target determination unit identifies the extraction target from among the plurality of persons based on one or more of feature values including a face direction, a quantity of blurring of a face image, an openness of eyes, and a direction of a line-of-sight, regarding the detected faces of the plurality of persons.

5. A method for editing a moving image, wherein a moving image editing apparatus equipped with a display unit capable of displaying the moving image performs the steps of:
    allowing a user to specify a frame in the moving image displayed on the display unit;
    detecting a face of one of a plurality of persons from an image of the specified frame;
    automatically identifying the one of the plurality of persons as an extraction target in the moving image;
    automatically identifying a related person to add to the extraction target based on predetermined correlation information linking the related person to the identified one of the plurality of persons;
    tracking the extraction target comprising the one of the plurality of persons and the related person in the moving image to thereby select a scene in which the extraction target appears; and
    extracting a partial moving image comprising the selected scene from the moving image.

6. A non-transitory computer readable storage medium storing a program for causing a moving image editing apparatus equipped with a display unit capable of displaying a moving image to perform the following steps when executed on a computer:
    allowing a user to specify a frame in the moving image displayed on the display unit;
    detecting a face of one of a plurality of persons contained in the frame in the moving image;
    automatically identifying the one of the plurality of persons as an extraction target;
    automatically identifying a related person to add to the extraction target based on predetermined correlation information linking the related person to the identified one of the plurality of persons;
    tracking the extraction target comprising the one of the plurality of persons and the related person to thereby select a scene in which the extraction target appears in the moving image; and
    extracting a partial moving image comprising the selected scene from the moving image.

* * * * *